No. 735,194. Patented August 4, 1903.

UNITED STATES PATENT OFFICE.

EDWARD G. ASHLEY, OF ROCHESTER, NEW YORK.

CUSHION-FRAME.

SPECIFICATION forming part of Letters Patent No. 735,194, dated August 4, 1903.

Application filed July 5, 1902. Serial No. 114,364. (No model.)

*To all whom it may concern:*

Be it known that I, EDWARD G. ASHLEY, a citizen of the United States, and a resident of Rochester, in the county of Monroe and State of New York, have invented certain new and useful Improvements in Cushion-Frames, of which the following is a specification.

This invention relates to cushion-frames for bicycles and like vehicles, and has for its object to provide a frame of compact form and great elasticity and one whose resiliency can be regulated. Its novel features are set forth in the specification and claims.

In the drawings, Figure 1 represents the cushion-frame applied to the rear fork of a bicycle, a portion of the casing being broken away to show the location of certain of the inner parts; and Fig. 2 is a longitudinal section of Fig. 1.

A represents a tube like those from which the rear-wheel fork of bicycle-frames of the type known as the "safety-frame" are usually made. This tube A performs a double function. Its lower end being hermetically sealed is used, in connection with the piston hereinafter described, as an air-cushion, and it also affords a support for one of the springs which coöperate with the said air-cushion to relieve the frame from shocks and vibration to which it is subjected. The spring just referred to is represented by Y in Figs. 1 and 2 and is seated directly upon a ring D, which in turn is screwed into the top of the tube A. The said spring Y is compressed against the shoulder $b$ upon the guide B, and the latter is connected with a rigid part of the bicycle-frame, so that when the lower tube A is elevated, as when the rear wheel of the bicycle encounters an obstruction in the road, said tube will compress said spring Y against said shoulder $b$. A second spring X is interposed between the said guides B and that said rigid part of the bicycle-frame which receives the compression of the spring Y, as aforesaid. One end of said second spring is attached to the frame of the bicycle and the other end is seated upon said guide B. The device may be compactly made without sacrificing the length of the said spring X by seating said spring X within the guide B at or near its lower end. In the drawings the guide B is represented as tubular in form and closed at its lower end, so as to seat said spring X at that point. The lower end of said spring X is firmly secured to its seat in the lower end of the guide B by means of the block $b'$, which is spirally grooved to receive the convolutions of the spring X. The upper end of the spring X is similarly locked to a block $c$, which is secured to the frame of the bicycle by the bolt $C^2$. For the purpose of inclosing the upper end of said spring X a tube C is employed, and the block $c$ is placed within the upper end of this tube. The outer spring Y is similarly inclosed against dust by a shell B', which in the drawings is represented as integral with the guide B and the shoulder $b$. A casing C' is shown in the drawings as surrounding the tube C and extending down over the shoulder $b$. Thus all of the parts are inclosed against dust, strength is imparted to the device, and it is given an attractive appearance.

The shell B' instead of being attached to the shoulder $b$ may be attached to or made a continuous part of either the tube A or the casing C'; but the construction shown is the best for assembling the parts.

The piston upon which the tube A slides is represented by E in the drawings and is shown as attached to the lower end of the guide B. It is represented in the drawings as consisting of a cap that is secured upon the lower end of said guide B by the same screw $b^2$ that holds the block $b'$ within said guide B. The edge of said piston E is adapted to engage with the lower side of the ring D, and so to prevent said piston from being withdrawn from said tube A.

The lower end of the guide B is slotted longitudinally, as represented by $b^3$, Fig. 2, and an inwardly-projecting pin $d$ upon said ring D lies within this slot and prevents said ring from turning upon the guide B. The piston E is also prevented from turning upon said guide B by the tongue $e$, which also enters the said slot $b^3$ in said guide B. By the coöperation of these two springs it is possible to attain a great degree of elasticity within small compass and also to so regulate the elasticity that the device will absorb both the vibration produced by the gearing of the bicycle and other slight jars produced by unevenness in the road and at the same time be capable of withstanding or counteracting severe shocks. If, for example, the spring Y is made lighter than the spring X, so that under the weight of the rider the spring Y is normally somewhat compressed, while the spring X is only slightly affected, the vibration caused by the gearing and the jarring caused by unevenness in the road and small obstructions will compress the more sensitive spring Y and be taken up by it, and yet if a more severe shock is encountered that cannot be taken up altogether by the spring Y it will force up the shoulder $b$, and consequently the guide B, against the resistance of the spring X, thereby compressing it also, and will be absorbed by it. So, too, it is evident that springs of different degrees of resiliency can readily be substituted one for another, so as to adapt the device to the weight of different riders; but means are provided in connection with this device for effecting this latter object without the necessity of changing the springs. The spring Y is placed under initial compression, and the resiliency of said spring Y is adjusted to heavier weights than that to which it is originally adapted by changing the location of the seat for the lower end of the said spring Y, so as to increase the initial compression. For that purpose a ring D' is employed that is adapted to receive the guide B and to rest upon the top of the ring D and beneath the spring Y. A series of such rings of various widths adapted to properly compress the spring Y for different weights if provided for each cushion device will afford ready means for regulating the resiliency of the spring Y to meet all requirements. A material advantage derived from thus regulating the resiliency of the spring of the device by means of such rings, as D', is that it makes it possible for a manufacturer of these cushion-frames to make the said spring Y a standard uniform size and the same resiliency for all such devices and by supplying the dealer with rings of proper width for adapting the said springs to different weights to enable the dealer to adjust each device to the requirements of his customer.

The spring Y is placed under initial compression and so maintained by means of the piston E in connection with the screw $b^2$. This will be more fully understood if the manner of assembling the device is explained.

In the construction shown in the drawings the device is composed of three parts irrespective of the springs. The upper member comprises the tube C, the casing C', and the bolt $C^2$ and has the block $c$ secured in the upper end of said tube C. The second or middle member of the device consists of the guide B, with its shoulder $b$ and casing B' attached thereto, and has the block $b'$ secured to the lower end of said guide B. The lower member of the device consists of the tube A. To assemble these several parts with the springs X and Y, the spring Y and the ring D are slipped successively over the guide B, and the plunger E is screwed upon the bottom of said guide B. The spring X is inserted within the guide B. The upper member of the device, comprising the tube C and casing C', is placed upon said spring X and shell B', respectively. The upper member is turned until the ends of the spring X are screwed upon the blocks $b'$ and $c$, respectively. The upper and the middle members of the device which are thus connected together are then inserted in the tube A, the piston E and guide B alone entering it, and the ring D is screwed within the top of said tube A, thus locking the whole device together.

If one of the rings D' is to be employed, it is placed upon the guide B before the ring D is placed thereon, and the spring is placed under compression by means of the screw $B^2$ before the upper and middle members are connected with the tube A.

It is obvious that as the piston E is forced upon the end of the ring D by the screw $b^2$ it will in turn force the rings D and D' inwardly, thereby compressing the spring Y against the shoulder $b$, and that the spring will be retained in its compressed condition. When the ring D is screwed within the tube A, said ring D becomes a stationary seat for said spring Y, and said piston E is free to descend into said tube A against the resistance of said spring Y and the resistance caused by the sudden compression of air within the tube A, the piston E fitting the tube A snugly.

It has been explained how an obstruction in the road that tends to elevate the rear wheel of the bicycle, and with it the tube A, will both compress the air within said tube upon the piston E and compress the spring Y against the shoulder $b$. This is the relative action of these parts of the device described above as the middle and lower members, respectively. There is in addition to such action a relative movement between the said upper and middle members, which has also been explained. Said last-mentioned members are movable relatively to each other against the resistance of the spring X—that is to say, said spring X tends to prevent them from approaching each other. When, therefore, the spring Y is compressed against the shoulder $b$, as aforesaid, the shock is transmitted from said second member, of which the shoulder $b$ is a part, to the spring X, and the shock expends itself upon these two springs, each taking a part of it. Since the spring Y is placed under initial compression, the transmission of the shock from said spring Y to the other spring X is so gradual that there is no jarring or irregularity in the action of the device.

What I claim is—

1. In a cushion-frame for bicycles and like vehicles, the combination of two relatively movable members; means for attaching one of said members to a fixed part of the frame; a spring tending to prevent said members from approaching each other; a second spring supporting said members by connection at one end with the unattached member, and at its other end with a fixed part of the frame.

2. In a cushion-frame for bicycles and like vehicles, the combination of two relatively movable members; means for attaching one of said members to a fixed part of the frame; a spring tending to prevent said members from approaching each other; a second spring of different resiliency from the one first mentioned adapted to support said members by connection at one end with one of them, and at its other end with a fixed part of the frame, whereby said springs act successively.

3. In a cushion-frame for bicycles and like vehicles, the combination of two relatively movable members; means for attaching one of said members to a fixed part of the frame; a spring tending to prevent them from approaching each other; a second spring, adapted to support said members coiled around one of them and connected at one end with one of said members, and with a support at its other end, and a support for said last-mentioned spring.

4. In a cushion-frame for bicycles and the like vehicles, the combination of two relatively movable members; means for attaching one of said members to a fixed part of the frame; a spring tending to prevent said members from approaching each other; a tube adapted to receive the unattached member; a spring adapted to support the last-mentioned member within said tube, and connected with it; and a support for said last-mentioned spring.

5. In a cushion-frame for bicycles and like vehicles, the combination of two relatively movable members; means for attaching one of said members to a fixed part of the frame; a spring tending to prevent said members from approaching each other; a spring coiled around said members and connected at one end with the unattached member; a support for said last-mentioned spring; and a shell adapted to inclose said last-mentioned spring.

6. In a cushion-frame for bicycles and like vehicles, the combination of two relatively movable members; means for attaching one of said members to a fixed part of the frame; a shoulder upon the unattached member; a spring tending to prevent said members from approaching each other; a spring beneath said shoulder and adapted to support said members; and a support for said last-mentioned spring.

7. In a cushion-frame for bicycles and like vehicles, the combination of two relatively movable members; means for attaching one of said members to a fixed part of the frame; a shoulder upon the unattached member; a spring tending to prevent said members from approaching each other; a spring beneath said shoulder and adapted to support said members; a shell adapted to inclose said last-mentioned spring; and a support for said last-mentioned spring.

8. In a cushion-frame for bicycles and like vehicles, the combination of two relatively movable members; means for attaching one of said members to a fixed part of the frame; a shoulder upon the unattached member; a spring tending to prevent said members from approaching each other; a coiled spring beneath said shoulder and adapted to support said members; a shell adapted to inclose said last-mentioned spring and attached to said shoulder; and a support for said last-mentioned spring.

9. In a cushion-frame for bicycles and like vehicles, the combination of two relatively movable members; means for attaching one of said members to a fixed part of the frame; a shoulder upon the unattached member, and a shell surrounding it, said shoulder and said shell being both integral with such member; a spring tending to prevent said members from approaching each other; and a second spring beneath said shoulder, tending to support said members; and a support for said last-mentioned spring.

10. In a cushion-frame for bicycles and like vehicles, the combination of two relatively movable members; means for attaching one of said members to a fixed part of the frame; a spring tending to prevent said members from approaching each other; a second spring supporting said members by connection with only one of them; a support for said last-mentioned spring; and an air-cushion coöperating with said springs.

11. In a cushion-frame for bicycles and like vehicles, the combination of three relatively movable members, consisting of two members each adapted to be connected with a fixed part of the bicycle-frame, and an intermediate member; and springs tending, respectively, to prevent each of the outer members from approaching said intermediate member.

12. In a cushion-frame for bicycles and like vehicles, the combination of a tube adapted to be attached to a vehicle-frame; two relatively movable members, one of which is adapted to slide within the first-mentioned tube, and the other to be attached to a fixed part of the frame; a spring tending to prevent said relatively movable members from approaching each other; a second spring supporting said member within the first-mentioned tube; and a support for said last-mentioned spring.

13. In a cushion-frame for bicycles and like vehicles, the combination of a lower tube adapted to be attached to a vehicle-frame and having its lower end hermetically sealed; two relatively movable members one of which is adapted to slide within the first-mentioned tube and the other to be attached to a fixed part of the frame; a spring tending to prevent said members from approaching each other; a piston attached to said members; a second spring supporting said piston within the first-mentioned tube; and a support for said last-mentioned spring.

14. In a cushion-frame for bicycles and like vehicles, the combination of a lower tube adapted to be attached to a vehicle-frame; two relatively movable members one of which is adapted to be attached to a fixed part of the frame and the other to slide within the first-mentioned tube; a shoulder upon the said member last specified; a spring tending to prevent said members from approaching each other; a second spring beneath the said shoulder upon one of said members, and adapted to support said members within the first-mentioned tube; and a support for said last-mentioned spring.

15. In a cushion-frame for bicycles and like vehicles, the combination of a lower tube adapted to be attached to a vehicle-frame; two relatively movable members one of which is adapted to be attached to a fixed part of the frame and the other to enter the first-mentioned tube; a spring tending to prevent said relatively movable members from approaching each other; means for locking said spring to said tubes; a second spring supporting said relatively movable members within the first-mentioned tube; a support for said last-mentioned spring; and means for preventing said relatively movable members from being withdrawn from said first-mentioned tube.

16. In a cushion-frame for bicycles and like vehicles, the combination of the tube A, attached to a fixed part of the frame; the guide B having the shoulder $b$; the shell B' attached to said shoulder; the spring Y beneath said shoulder $b$, and seated upon the tube A; the tube C adapted to be attached to a fixed part of the frame, and to slide within the guide B; and the spring X seated within the guide B and tube C, substantially as shown and described.

17. In a cushion-frame for bicycles and like vehicles, the combination of the tube A hermetically closed at one end attached to a fixed part of the frame; the guide B; the tube C, adapted to be attached to a fixed part of the frame; the piston E; the spring X; the shoulder $b$ upon the tube B; the spring Y; and a support for said last-mentioned spring.

18. In a cushion device for bicycles and like vehicles, the combination of the tube A, attached to a fixed part of the frame; the guide B, adapted to slide therein, and having a shoulder $b$; the spring Y beneath said shoulder $b$ and seated upon the tube A; the shell B' attached to said shoulder; the concentric tube C adapted to be attached to a fixed part of the frame, and casing C' adapted respectively, to slide within the guide B and to contain the shell B'; and the spring X, within said guide B and tube C.

19. In a cushion device for bicycles and like vehicles, the combination of the tube A, attached to a fixed part of the frame; the ring D secured within the top of said tube; the guide B adapted to slide within said tube A; the piston E upon the bottom of the guide B adapted to engage within the ring D; the shoulder $b$ upon said guide B; the spring Y beneath the shoulder $b$ and seated upon the ring D; the tube C adapted to slide within the guide B; blocks $b'$ and $c$ secured within said guide B and tube C, respectively, at their ends; and the spring X, within said guide B and tube C, and locked thereto by means of said blocks $b'$ and $c$, respectively; substantially as shown and described.

20. In a cushion-frame for bicycles and like vehicles, the combination of the tube A, attached to a fixed part of the frame; the guide B; a spring coiled around the guide B that tends to prevent said guide B from moving relatively to the tube A; a support for said spring; and means for retaining said spring normally under compression.

21. In a cushion-frame for bicycles and like vehicles, the combination of the tube A, attached to a fixed part of the frame; the guide B having the shoulder $b$; a spring coiled around said guide B, and seated upon said tube A, beneath said shoulder, tending to prevent said guide B from approaching said tube A; and means for retaining said spring normally under compression.

22. In a cushion-frame for bicycles and like vehicles, the combination of the tube A; a piston within said tube; a spring that tends to prevent said piston from descending said tube A; a support for said spring; and means for retaining said spring normally under compression.

23. In a cushion-frame for bicycles and like vehicles, the combination of the tube A; the guide B; the shoulder $b$; the spring Y beneath said shoulder and seated upon said tube A; a shoulder upon the inside of the tube A; and a shoulder upon the guide B adapted to engage with the shoulder upon the inside of the tube A and thereby to prevent the withdrawal of the guide B from the tube A.

24. In a cushion-frame for bicycles and like vehicles, the combination of the tube A; the guide B having the shoulder $b$; the spring Y beneath said shoulder and seated upon the tube A; the ring D' adapted to seat said spring Y; and means for retaining said spring normally under compression.

25. In a cushion-frame for bicycles and like vehicles, a device for placing the spring under initial compression, comprising a guide for said spring having a seat for its upper end; an adjustable seat for the lower end of said spring, supported upon said guide; and means for adjusting the position of said seat for the lower end of said spring.

26. In a cushion-frame for bicycles and like vehicles, a device for placing the spring under initial compression, comprising the guide B, having the shoulder $b$, the cap E upon the lower end of the guide; and means for compressing said cap upon said guide.

27. In a cushion-frame for bicycles and like vehicles, a device for placing the spring under initial compression, comprising the guide B having the shoulder $b$, the ring D adapted to engage with the tube A; the cap E; and means for compressing said cap upon said guide.

EDWARD G. ASHLEY.

Witnesses:
D. GURNEE,
F. BISSELL.